United States Patent [19]

Sawayama et al.

[11] Patent Number: 5,389,203
[45] Date of Patent: Feb. 14, 1995

[54] PAPER-MAKING ADDITIVES COMPRISING CATIONIC POLYMERS

[75] Inventors: Shigeru Sawayama, Yokohama; Kohichi Satoh, Zama; Shin-ichi Sato; Toshiaki Sakakihara, both of Kitakyushu, all of Japan

[73] Assignee: Mitsubishi Kasei Corporation, Tokyo, Japan

[21] Appl. No.: 115,917

[22] Filed: Sep. 1, 1993

[30] Foreign Application Priority Data

Sep. 3, 1992 [JP] Japan ................... 4-235833

[51] Int. Cl.$^6$ ........................................... D21H 17/45
[52] U.S. Cl. .................. 162/135; 162/168.2; 162/168.3; 162/168.4; 162/168.5
[58] Field of Search ............... 162/168.2, 168.3, 168.4, 162/168.5, 168.1, 135; 427/391; 210/734, 735

[56] References Cited

U.S. PATENT DOCUMENTS

| | | | |
|---|---|---|---|
| 3,006,756 | 10/1961 | Völker et al. | 75/118 |
| 3,288,707 | 11/1966 | Hurwitz et al. | 210/54 |
| 3,576,740 | 4/1971 | Annand et al. | 210/54 |
| 4,006,247 | 2/1977 | Panzer et al. | 526/194 |
| 4,444,667 | 4/1984 | Burkert et al. | 210/735 |
| 4,774,285 | 9/1988 | Pfohl et al. | 525/60 |
| 4,880,497 | 11/1989 | Pfohl et al. | 162/135 |
| 4,943,676 | 7/1990 | Pinschmidt, Jr. et al. | 525/383 |
| 4,957,977 | 9/1990 | Itagaki et al. | 525/328.4 |
| 5,064,909 | 11/1991 | Itagaki et al. | 525/340 |
| 5,185,083 | 2/1993 | Smigo et al. | 210/735 |
| 5,281,340 | 1/1994 | Sato et al. | 210/734 |

FOREIGN PATENT DOCUMENTS

| | | |
|---|---|---|
| 201192 | 12/1986 | European Pat. Off. . |
| 3715824 | 11/1987 | Germany . |
| 2-238003 | 9/1990 | Japan . |

*Primary Examiner*—Peter Chin
*Attorney, Agent, or Firm*—David G. Conlin; Linda M. Buckley

[57] ABSTRACT

Disclosed herein is a paper-making additive comprising a specified cationic polymer having an amidine structure. The cationic polymer additive for paper-making according to the present invention has 20 to 90% by mole of units represented by the formula (1) and/or (2):

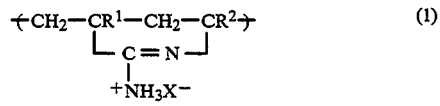

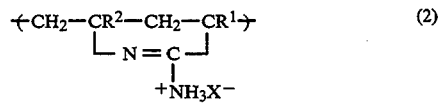

wherein $R^1$ and $R^2$ independently denote a hydrogen atom or a methyl group, and $X^-$ denotes an anion; and has a reduced viscosity of 0.1 to 10 dl/g as measured in a 1N saline solution of 0.1 g/dl at 25° C. The additives are excellent in improving paper or pulp properties, such as freeness, filler retention and paper strength.

43 Claims, No Drawings

PAPER-MAKING ADDITIVES COMPRISING CATIONIC POLYMERS

BACKGROUND OF THE INVENTION

The present invention relates to an additive for paper-making comprising a cationic polymer. More particularly, it relates to a paper-making additive comprising a cationic polymer having an amidine structure, which may be used for improving freeness, filler retention and paper strength in the paper-making industry.

Cationic polymers are used in such applications as flocculating agents, paper-treating agents, and the like. Conventionally known cationic polymers include polymers of metal or ammonium salts of dialkylaminoalkyl (meth) acrylates, and Hofmann degradation or Mannich reaction products of polyacrylamides. Recently, polyvinylamines obtained by partially modifying homo- or copolymers of N-vinylformamide have been proposed in U.S. Pat. Nos. 4,421,602, 4,774,285 and 4,957,977 and Japanese Patent Application Laying-open (KOKAI) No. 63-6198 (1988).

However, the conventional cationic polymers have some disadvantages in certain applications; for example, they do not sufficiently dissociate under neutral or weak acidic conditions to make paper. Further, in conventional acidic paper-making methods, large amounts of sulfuric bands are usually used as agents for fixing anionic paper strength improvers, causing a problem of wear of a paper machine, deterioration of produced paper, and waste water. Accordingly, there is a great need for development of a method for making paper under neutral or weak acidic conditions, in which such problems may be avoided and inexpensive calcium carbonate can be used as a filler.

SUMMARY OF THE INVENTION

The present inventors have made great efforts to overcome the above-mentioned problems and found that specified cationic polymers having an amidine structure have a remarkably excellent performance as paper-making additives. Thus, the present invention has accomplished.

Typically, the paper-making additives comprising the cationic polymer according to the present invention have 20 to 90% by mole of a repeating amidine unit represented by the formula (1) and/or (2):

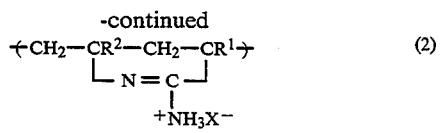

0 to 2% by mole of a repeating substituted amino group unit represented by the formula (3):

0 to 70% by mole of a repeating cyano group unit represented by the formula (4):

and 0 to 70% by mole of a repeating amino group unit represented by the formula (5):

wherein $R^1$ and $R^2$ independently denote a hydrogen atom or a methyl group, $R^3$ denotes an alkyl group having 1 to 4 carbon atoms or a hydrogen atom, and $X^-$ denotes an anion; and have a reduced viscosity of 0.1 to 10 dl/g as measured in a 1N saline solution of 0.1 g/dl at 25° C.

DESCRIPTION OF THE INVENTION

The amidine units represented by the formulae (1) and (2) have an amidine structure of 5-membered ring. Generally, they are equivalently observed in the nuclear magnetic resonance (NMR) and infrared (IR) spectroscopy and quantitatively determined in a total amount of the units (1) and (2). However, with respect to repeating units of a polymer produced in the amidinization reaction as illustrated schematically:

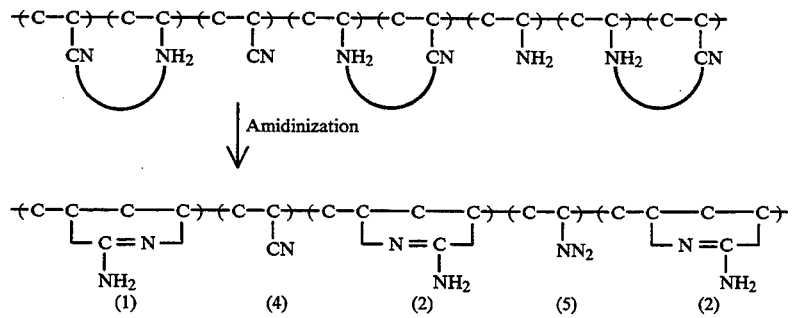

the two kinds of repeating units represented by the formulae (1) and (2) should be taken into consideration. In the above illustration, (4) and (5) represent a cyano group unit and an amino group unit, respectively, which have not been involved in the amidinization reaction.

Methods for preparing the cationic polymers having the amidine structure are not particularly limited. Generally, such polymers may be prepared by forming a copolymer of an ethylenically unsaturated monomer having a primary amino group or a substituted amino group convertible into a primary amino group with a nitrile such as acrylonitrile or methacrylonitrile, and reacting the cyano group with the primary amino group in the copolymer.

The ethylenically unsaturated monomer is preferably represented by the general formula:

$$CH_2=CR^2-NHCOR^3$$

wherein $R^2$ denotes a hydrogen atom or a methyl group, $R^3$ denotes an alkyl group having 1 to 4 carbon atoms or a hydrogen atom. In the copolymer, substituted amino groups derived from such ethylenically unsaturated monomers are readily converted into primary amino groups by hydrolysis or alcoholysis. These primary amino groups are in turn reacted with the adjacent cyano groups to amidinize. Examples of the monomers may include N-vinylformamide ($R^2$=H, $R^3$=H) and N-vinylacetamide ($R^2$=H, $R^3$=$CH_3$).

The molar ratio of the ethylenically unsaturated monomer to nitrile to be polymerized is generally from 20:80 to 80:20, although other ratio values can be used in the copolymerization, if desired; for example, larger proportions of the ethylenically unsaturated monomer may be used. Generally, in the cationic polymers used as the paper-making additives of the invention, the larger the proportion of the amidine units in the molecule, the better their performance. The amine unit in the polymer may also be believed to contribute advantageously to the paper-making performance. Therefore, the molar ratio of the ethylenically unsaturated monomer to nitrile which may provide copolymers suitable for paper-making additives is usually from 20:80 to 80:20, preferably from 40:60 to 60:40.

The ethylenically unsaturated monomer and nitrile may be copolymerized radically in a conventional manner and any of conventional methods, such as bulk polymerization, solution polymerization causing precipitation in aqueous solution, suspension polymerization and emulsion polymerization, may be employed. The polymerization in a solvent is generally carried out using the starting materials at a monomer concentration of 5 to 80% by weight, preferably 20 to 60% by weight. Any conventional radical initiators may be used in the radical polymerization. Preferably, azo compounds such as 2,2'-azobis-2-amidinopropane hydrochloride are employed. The polymerization is generally effected under inert gas stream at a temperature of 30° to 100° C. The resulting copolymers may be subjected to the subsequent amidinization reaction directly or after diluted, that is, in the form of a solution or suspension. Further, the copolymers may be treated so as to remove solvents therefrom in a known manner and dried to separate them as a solid which is then subjected to the amidinization. The resulting polymers can be provided with desired molecular weights by controlling the amount of radical initiator used and the reaction temperature.

When N-vinylamide compounds represented by the above-described general formula are used as the ethylenically unsaturated monomers, the paper-making additives comprising the cationic polymer of the present invention may be prepared by the subsequent amidinization reaction carried out in a two-step process wherein the substituted amino groups in the copolymer are converted into primary amino groups which are then reacted with the adjacent cyano groups to produce an amidine structure. Alternatively, the copolymer may preferably be heated in water or an alcoholic solution in the presence of a strong acid or strong base to produce an amidine structure in a single step. In the latter case, it is also believed that primary amino groups may be produced intermediately.

Illustratively, the latter preferable amidinization reaction may usually be carried out by adding to the copolymer 0.9 to 5.0 equivalents, preferably 1.0 to 3.0 equivalents, based on one equivalent of the substituted amino group in the copolymer, of a strong acid, preferably hydrochloric acid, and heating at a temperature of 80° to 150° C., preferably 90° to 120° C., for 0.5 to 20 hours, to produce a cationized polymer having an amidine unit. Generally, the amidinization may proceed better and more completely with larger equivalent ratio of strong acid relative to substituted amino groups and at higher reaction temperatures. In the amidinization, water will be present in the reaction system in an amount of 10% by weight or more, preferably 20% by weight or more, based on the copolymer to be subjected to the reaction.

Most typically, the paper-making additive comprising the cationic polymer according to the present invention is prepared by copolymerizing N-vinylformamide with acrylonitrile and heating the resulting copolymer, usually in the form of an aqueous suspension, in the presence of hydrochloric acid to form an amidine unit from the substituted amino group and the adjacent cyano group. The paper-making additives comprising the cationic polymers having different compositions may be prepared by selecting the molar ratio of N-vinylformamide to acrylonitrile to be copolymerized and the conditions for amidinization of the copolymers.

Typically, the paper-making additive comprising the cationic polymer according to the present invention contains 20 to 90% by mole of a repeating unit represented by the formula (1) and/or (2), 0 to 2% by mole of a repeating unit represented by the formula (3), 0 to 70% by mole of a repeating unit represented by the formula (4), and 0 to 70% by mole of a repeating unit represented by the formula (5), and has a reduced viscosity of 0.1 to 10 dl/g. The reduced viscosity is herein measured at 25° C. in a 1N saline solution containing the cationic polymer at a concentration of 0.1 g/dl. In the paper-making additives, it may be believed that the amidine unit contributes mainly to the paper-making performance.

Generally, the paper-making performance tends to increase as the proportion of amidine unit in the cationic polymer becomes larger. However, it is difficult to prepare cationic polymers having the amidine unit in a proportion exceeding 90% by mole by the above-described methods such as by heating the copolymer in an aqueous hydrochloric acid solution. Therefore, the proportion of amidine unit in the paper-making additive be preferably in the range of 30 to 85% by mole. Most preferably, the paper-making additives contain the amidine unit in a proportion of 50 to 80% by mole due to easy preparation and better performance thereof. For instance, one of the most preferable paper-making additives may contain 50 to 80% by mole of the amidine unit and 0 to 2% by mole of the substituted amino group unit wherein the total proportion of the amidine unit, the cyano group unit and the amino group unit is 97 to 100% by mole.

The repeating unit (3) is derived from a more expensive N-vinylamide compound relative to acrylonitrile and does not appear to contribute advantageously to the paper-making performance. Generally, the content of repeating unit (3) should be 0 to 2% by mole, preferably 0 to 1% by mole. When larger amounts of the repeating unit (3) are present, the dehydrating properties and/or storage stability of the paper-making additive may sometimes deteriorate. However, when the proportion of amidine unit is 50 to 90% by mole, paper-making additives having good performance may be obtained even if larger amounts of the repeating unit (3) are present. For example, such a paper-making additive may contain 50 to 80% by mole of the amidine unit and 2 to 20% by mole of the repeating unit (3), 0 to 48% by mole of the repeating unit (4) and 0 to 48% by mole of the repeating unit (5) wherein the total proportion of the repeating units (1) to (5) is 90% by mole or more, preferably 97% by mole or more. Such paper-making additives having larger proportions of the repeating unit (3) may be prepared by adding to the copolymer of N-vinylformamide and a nitrile, not more than an equivalent of a strong acid based on the substituted amino groups in the copolymer, and heating the reaction mixture in the presence of water in an amount of not more than 20% by weight based on the copolymer. The resulting cationic polymer is usually poor in stability upon storage; preferably, a strong acid is added to the polymer to completely neutralize the cationic units in the repeating units (1), (2) and (5).

The effect of the repeating unit (4) on the paper-making performance has not been understood, but at least it may be believed that there is no adverse effect. The repeating unit (4) is present in the paper-making additive in an amount of 0 to 70% by mole. The nitriles are inexpensive and the presence of the repeating unit (4) will reduce the cost for manufacturing the paper-making additives. Thus, the cost performance is effectively improved. Preferably, the proportion of repeating unit (4) present in the paper-making additive is 5 to 60% by mole, particularly 5 to 50% by mole.

In the paper-making additives of the present invention, the molar ratio of amidine unit to repeating unit (4), i.e., (1)+(2)/(4), should generally be in the range of 0.5 to 10.0, preferably in the range of 2.0 to 5.0, since larger proportions of amidine unit usually provide more excellent performance.

The repeating unit (5) is cat ionic and may be believed to also contribute to the paper-making performance like the amidine unit. The repeating unit (5) is generally present in the flocculating agent in a proportion of 0 to 70% by mole, preferably 5 to 60% by mole. The repeating units (1), (2) and (5) all are derived from the repeating unit (3). Preferably, therefore, as many repeating units (3) as possible are converted into the repeating units (1), (2) or (5). The proportion of the total repeating units (1), (2) and (5) present in the paper-making additive is generally 40% by mole or higher, preferably in the range of 60 to 95% by mole. This means that the repeating units which are believed to advantageously contribute to the paper-making performance comprise a major proportion of the repeating units constituting the paper-making additive. In the paper-making additives of the present invention, the molar ratio of amidine unit to repeating unit (5), i,e., (1)+(2)/(5), is generally in the range of 0.5 to 10.0. Preferably, the molar ratio is in the range of 2.0 to 5.0 since the amidine unit may more effectively contribute to the performance than the repeating unit (5). As stated previously, the amidine structure is formed by the reaction of the repeating unit (4) with either the adjacent repeating unit (3) or the adjacent repeating unit (5) produced therefrom, leaving some of the repeating units (4) unreacted. Accordingly, one of the preferred paper-making additives according to the present invention may contain the repeating units (1), (2) and (5) in an amount of 70 to 90% by mole in total wherein the total amount of the repeating units (1), (2), (4) and (5) is at least 90% by mole, preferably at least 97% by mole.

In addition to the above-mentioned repeating units, the paper-making additives of the present invention may further contain other repeating units. However, the above-mentioned repeating units should comprise at least 90% by mole, preferably at least 95% by mole in the paper-making additives.

Illustrative examples of the other repeating units which may be contained in the paper-making additives of the present invention include those represented by the following formulae (6) to (9):

(6)

(7)

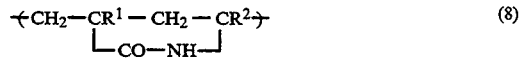

(8)

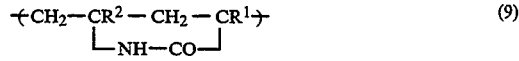

(9)

wherein $R^1$ and $R^2$ independently denote a hydrogen atom or a methyl group, and $M^+$ denotes a cation.

The repeating units (6) and (7) are produced by hydrolysis of the repeating unit (4). Thus, in the formation of amidine structure by heating copolymers of a nitrile and N-vinylamide compounds in the presence of a strong acid and water, some of the cyano groups in the copolymer are hydrolyzed to produce the amide group of the repeating unit (6) or the carboxyl group of the repeating unit (7). Although the effect of the repeating amide group unit (6) on the paper-making performance is not clear, it is generally believed that smaller proportions of the repeating unit (6) may be preferably employed. Therefore, the proportion of the repeating unit (6) in the paper-making additive according to the present invention is generally 0 to 5% by mole, preferably 0 to 2% by mole. The repeating carboxyl group unit (7) is anionic and may be believed to affect adversely the paper-making performance. Therefore, the proportion of the unit (7) is preferably small. The proportion of repeating unit (7) in the paper-making additive is generally 0 to 5% by mole, preferably 0 to 2% by mole. Further, it is believed that the repeating lactam units (8) and/or (9) may be produced from the repeating units (5) and (6). The effect thereof on the paper-making performance is not clear but the proportion thereof will generally be 0 to 5% by mole, preferably 0 to 2% by mole.

As stated previously, the cationic polymers according to the present invention have a reduced viscosity in the range of 0.1 to 10 dl/g. However, it appears that some preferred range of reduced viscosity exists depending on the end use as a paper-making additive. For instance, when it is used as a freeness- or filler retention-improving agent, the reduced viscosity is usually in the range of 0.1 to 10 dl/g, preferably 1 to 10 dl/g, more preferably 2 to 10 dl/g. If it is used as a paper strength improving agent, the reduced viscosity is generally in the range of 0.1 to 10 dl/g, preferably 0.1 to 5 dl/g, more preferably 0.5 to 4 dl/g.

The paper-making additives comprising the cationic polymers according to the present invention may be used in a usual manner like the conventional additives comprising other known polymers. The cat ionic polymers of the invention exhibit an excellent effect as a paper-making additive, for example, as an agent for improving the freeness, filler retention or paper strength. The additives may generally added in an amount of 0.001 to 5.0% by weight based on the dry weight of pulp to a pulp slurry having a concentration of 0.5 to 3.0% by weight. Generally, the additives may be added in the form of an aqueous solution having a concentration of about 0.01 to 5% by weight.

The use of the paper-making additives of the present invention is hereinbelow illustrated in more detail.

Freeness-improving agents may enhance the freeness of pulp on a wire mesh in the paper-making process and be particularly effectively used in making card boards such as paper boards where the freeness rate may affect the productivity. Filler retention-improving agents enhance the retention of fillers, such as kaolin, talc and calcium carbonate, or finely divided fibers in pulp in the paper-making process. When additives are used in these applications, the amount thereof used is generally in the range of 0.001 to 5% by weight, preferably 0.005 to 0.5% by weight, based on the dry weight of pulp.

Paper strength-improving agents are used to enhance the tear, tensile, bursting and surface strength. These agents may be added to slurries of pulp as internal additives upon paper making, or applied to the surface of raw paper, such as wet or dry paper, as external additives by a roll coater, size press or dipping machine. The amount of internal additives used is generally in the range of 0.001 to 5% by weight, preferably 0.05 to 2% by weight, based on the dry weight of pulp. If desired, other paper strength-improving agents such as cationic starch, sulfuric band and anionic agents may also be used.

The nature of pulp to be treated by the present invention is not particularly limited. Any pulps may be treated, such as gland pulp, sulfide pulp, kraft pulp, beaten waste paper, etc.

The paper-making additives of the present invention are very stable irrespective of the nature of water used to dissolve pulp, for example, even if in the dilute aqueous solution. Also, they are stable and effective under weak alkaline conditions, for instance in the case of using calcium carbonate as a filler. Accordingly, the additives are preferably used under neutral or weak alkaline paper making conditions.

EXAMPLES

The present invention will be more fully illustrated by the following examples, which do not limit the scope of the present invention as defined in the attached claims. In the examples all percentages are by weight unless otherwise stated.

Preparation of Polymers A to G:

Into a 50 ml four-necked flask equipped with a stirrer, a nitrogen inlet tube and a condenser, 6.0 g of a mixture comprising N-vinylformamide and acrylonitrile in a molar fraction as shown in Table 1, and 34.0 g of desalted water were introduced. The content of the flask was heated to 60° C. under nitrogen gas stream while stirring, after which 0.12 g of a 10% aqueous solution of 2,2'-azobis-2-amidinopropane dihydrochloride was added. After stirring was continued for 4 hours at 45° C., the reaction mixture was heated to 60° C. and held for further 3 hours to produce a suspension of precipitated polymer in water. To the suspension, 20 g of water was added followed by addition of 2 equivalents of concentrated hydrochloric acid based on the formyl groups in the polymer. The reaction mixture was held at a given temperature as indicated in Table 1 for 4 hours while stirring to amidinize the polymer. The resulting polymer solution was added to acetone and the precipitated polymer was dried under vacuum to yield Polymers A to G.

Preparation of Polymers H to J:

Into a 50 ml four-necked flask equipped with a stirrer, a nitrogen inlet tube and a condenser, 6.0 g of a mixture comprising N-vinylformamide and acrylonitrile in a molar fraction as shown in Table 1, and 34.0 g of desalted water were introduced. The content of the flask was heated to 45° C. under nitrogen gas stream while stirring, after which 0.12 g of a 10% aqueous solution of 2,2'-azobis-2-amidinopropane dihydrochloride was added. After stirring was continued for 4 hours at 45° C., the reaction mixture was heated to 60° C. and held for further 3 hours to produce a suspension of precipitated polymer in water. The precipitated polymer was filtered out and dried under vacuum at 40° C. to yield a solid having a water content of 15%. The solid was introduced into a 50 ml rotating eggplant type flask and one equivalent of concentrated hydrochloric acid based on the formyl groups in the polymer was added thereto. The reaction mixture was held at 100° C. for 5 hours to amidinize the polymer. The resulting polymer was added to acetone, washed and dried under vacuum to yield Polymers H to J.

Preparation Of Polymer K:

Into a 100 ml four-necked flask equipped with a stirrer, a nitrogen inlet tube and a condenser, 5 g of N-vinylformamide and 44.7 g of desalted water were introduced. The content of the flask was heated to 50° C. under nitrogen gas stream while stirring. Then, 0.3 g of a 5% aqueous solution of 2,2'-azobis-2-amidinopropane dihydrochloride was added and polymerization was effected at 50° C. for 9 hours. To the resulting aqueous polymer solution, 0.5 equivalents of sodium hydroxide and 0.05 equivalents of aqueous ammonia were mixed. The reaction mixture was held at 75° C. for 4 hours and hydrochloric acid was added thereto to neutralize. The solution was added to acetone to precipitate the polymer, which was then dried under vacuum to yield Polymer K.

Preparation of Polymers L to O:

Polymers L to Q were obtained in the same manner as in the Preparation of Polymers A to F except that the polymerization temperature was 60° C.

Preparation of Polymer R:

Polymer R was obtained in the same manner as in the Preparation of Polymer K except that the polymerization was effected at 60° C. for 4 hours.

The compositions and reduced viscosities of these polymers A to R were measured according to the following methods. The results are shown in Tables 1 and 2.

Compositional analysis:

The compositions of starting polymers before amidinization were calculated from integrated values of absorption peaks corresponding to respective monomer units in $^{13}C$ NMR spectroscopy.

The compositions of the polymers after amidinization were calculated from integrated values of absorption peaks corresponding to respective repeating units in $^{13}C$ NMR spectroscopy. The repeating units (1) and (2) were not distinguished from each other and the sum of both units was calculated; also, the repeating units (8) and (9) were taken together and the sum thereof was obtained.

The absorption peaks of the repeating units (1) and (2), (6), as well as (8) and (9) were observed contiguously in a very narrow region of about 170 to 185 ppm. Therefore, the attribution of each absorption peak to the corresponding structure was determined in the following manner:

Thus, the weight balance was confirmed by elementary analysis and measurement of water content of the polymer concerned. Further, $^{13}C$ NMR and IR spectra of the polymer concerned were precisely compared with those of known compounds having an amidine, amide or lactam group.

Measurement of reduced viscosity:

Each of the polymers was dissolved in 1N aqueous solution of sodium chloride to a concentration of 0.1 g/dl, and the reduced viscosity was measured at 25° C. using an Ostwald viscometer.

TABLE 1

| Polymer | Monomer Composition (mol %) N-Vinyl-formamide | Monomer Composition (mol %) Acrylo-nitrile | Amidinization Condition Temperature (°C.) | Amidinization Condition Time (Hr) | Polymer Repeating Unit (mol %) (1) + (2) Amidine | (3) Formyl | (4) Cyano | (5) Amino | (6) Amido | (7) Carboxy | (8) + (9) Lactam | Reduced Viscosity (dl/g) |
|---|---|---|---|---|---|---|---|---|---|---|---|---|
| A | 70 | 30 | 100 | 4 | 32 | 2 | 8 | 58 | 0 | 0 | 0 | 5.0 |
| B | 60 | 40 | 100 | 4 | 39 | 1 | 17 | 43 | 0 | 0 | 0 | 4.5 |
| C | 50 | 50 | 100 | 4 | 54 | 0 | 23 | 23 | 0 | 0 | 0 | 4.0 |
| D | 40 | 60 | 100 | 4 | 56 | 0 | 35 | 6 | 2 | 1 | 0 | 3.5 |
| E | 30 | 70 | 100 | 4 | 32 | 0 | 55 | 8 | 3 | 2 | 0 | 3.0 |
| F | 50 | 50 | 110 | 4 | 62 | 0 | 13 | 19 | 3 | 2 | 1 | 4.0 |
| G | 50 | 50 | 60 | 10 | 3 | 6 | 48 | 43 | 0 | 0 | 0 | 4.0 |
| H | 50 | 50 | 100 | 5 | 54 | 12 | 23 | 11 | 0 | 0 | 0 | 4.5 |
| I | 45 | 55 | 100 | 5 | 63 | 8 | 26 | 2 | 0 | 0 | 0 | 4.0 |
| J | 55 | 45 | 100 | 5 | 56 | 16 | 14 | 14 | 0 | 0 | 0 | 4.8 |
| K | 100 | 0 | — | — | 0 | 56 | 0 | 44 | 0 | 0 | 0 | 4.8 |

TABLE 2

| Polymer | Monomer Composition (mol %) N-Vinyl-formamide | Monomer Composition (mol %) Acrylo-nitrile | Amidinization Condition Temperature (°C.) | Amidinization Condition Time (Hr) | Polymer Repeating Unit (mol %) (1) + (2) Amidine | (3) Formyl | (4) Cyano | (5) Amino | (6) Amido | (7) Carboxy | Reduced Viscosity (dl/g) |
|---|---|---|---|---|---|---|---|---|---|---|---|
| L | 70 | 30 | 100 | 4 | 31 | 2 | 9 | 58 | 0 | 0 | 2.4 |
| M | 60 | 40 | " | " | 40 | 1 | 17 | 42 | 0 | 0 | 2.8 |
| N | 50 | 50 | " | " | 54 | 0 | 23 | 23 | 0 | 0 | 2.8 |
| O | 40 | 60 | " | " | 43 | 0 | 33 | 14 | 10 | 0 | 2.8 |
| P | 30 | 70 | " | " | 27 | 0 | 56 | 10 | 3 | 2 | 2.6 |
| Q | 50 | 50 | 60 | 10 | 1 | 0 | 49 | 41 | 0 | 0 | 2.5 |
| R | 100 | 0 | — | — | 0 | 60 | 0 | 40 | 0 | 0 | 2.5 |

TABLE 3

| Ex. No. | Polymer | Freeness (ml) |
|---|---|---|
| Ex. 1 | A | 305 |
| Ex. 2 | B | 300 |
| Ex. 3 | C | 315 |
| Ex. 4 | D | 310 |
| Ex. 5 | E | 295 |
| Ex. 6 | F | 315 |
| Ex. 7 | H | 310 |
| Ex. 8 | I | 325 |
| Ex. 9 | J | 315 |
| Comp. Ex. 1 | none | 240 |
| Comp. Ex. 2 | J | 285 |
| Comp. Ex. 3 | K | 275 |

Examples 10 to 18 and Comparative Examples 4 to 6
(Improvement of Filler Retention)

Into a 2 liter beaker, one liter of 0.5% LBKP slurry having a freeness of 410 ml as measured by Canadian standard method was added. While stirring, 30% by weight of paper-making talc, 0.3% by weight of fortified rosin and 4% by weight of sulfuric acid band were added based on pulp. Each Polymer in the form of 0.2% by weight aqueous solution was added in an amount of 0.03% by weight based on pulp. The mixture was Examples 1 to 9 and Comparative Examples 1 to 3
(Improvement of Freeness)

Into a 2 liter beaker, one liter of 0.3% LBKP slurry adjusted to a pH of 7.5 with calcium carbonate and having a freeness of 240 ml as measured by Canadian standard method was added. While stirring, each Polymer in the form of 0.2% by weight aqueous solution was added in an amount of 0.2% by weight based on pulp. The mixture was stirred at 200 rpm for one minute. The freeness value thereof was measured by a Canadian freeness tester. The results are shown in Table 3.

stirred at 200 rpm for one minute. This material was subjected to paper making process using a TAPPI standard rectangular machine to make paper of 60 g in basis weight. The ash content of the resulting paper was measured. The results are shown in Table 4.

TABLE 4

| Ex. No. | Polymer | Ash Content (%) |
|---|---|---|
| Ex. 10 | A | 16.8 |
| Ex. 11 | B | 16.5 |
| Ex. 12 | C | 17.8 |
| Ex. 13 | D | 17.2 |
| Ex. 14 | E | 16.5 |
| Ex. 15 | F | 17.9 |
| Ex. 16 | H | 16.9 |
| Ex. 17 | I | 18.6 |

TABLE 4-continued

| Ex. No. | Polymer | Ash Content (%) |
|---|---|---|
| Ex. 18 | J | 17.7 |
| Comp. Ex. 4 | none | 12.0 |
| Comp. Ex. 5 | G | 16.0 |
| Comp. Ex. 6 | K | 15.9 |

Examples 19 to 23 and Comparative Examples 7 to 9
(Improvement of Paper Strength)

Into a 500 ml beaker, 0.6% LBKP slurry having a freeness of 400 ml as measured by Canadian standard method and 17% calcium carbonate based on pulp were added. While stirring, a reagent as shown in Table 5 was added thereto. The material was subjected to paper making process at pH of 8.5 using a TAPPI standard rectangular machine to make paper of 60 g in basis weight. A copolymer of 2-methacryloyloxyethyltrimethylammonium chloride and acrylamide was used as a filler retention improving agent.

The resulting wet paper was dried for 3 minutes with a drum drier at 120° C. The resulting paper was allowed to stand at 20° C. under a relative humidity of 60% and burst factors were measured according to JIS-P8112 and JIS-P8113. The results are shown in Table 6.

TABLE 5

| Reagent Added | Concentration of Aqueous Solution (% by weight) | Amount Added Based on Pulp (% by weight) |
|---|---|---|
| Cationic Starch | 1.0 | 0.5 |
| Polymers L to R | 0.5 | 0.5 |
| Sizing (Alkylketene dimer) | 1.0 | 0.2 |
| Filler Retention Improver | 0.1 | 0.02 |

TABLE 6

| Ex. No. | Polymer | Burst Factor (kg/cm$^2$) |
|---|---|---|
| Ex. 19 | L | 1.46 |
| Ex. 20 | M | 1.47 |
| Ex. 21 | N | 1.63 |
| Ex. 22 | O | 1.57 |
| Ex. 23 | P | 1.49 |
| Comp. Ex. 7 | Q | 1.39 |
| Comp. Ex. 8 | R | 1.38 |
| Comp. Ex. 9 | none | 1.12 |

Burst Factor = (S/W) × 100 (kg/cm$^2$)
S: Bursting strength (kg/cm$^2$)
W: Basis weight of paper tested (g/m$^2$)

The paper making additives comprising the cationic water-soluble polymer having an amidine structure according to the present invention have excellent adsorptive property to pulp and may exhibit the excellent properties, such as improvement of freeness, filler retention and paper strength, even under neutral or weakly alkaline conditions. Thus, the additives of the present invention may greatly contribute to the paper making industry.

What is claimed is:

1. A process for making paper, comprising adding, to a pulp slurry, a cationic polymer which contains 20 to 90% by mole of a repeating unit represented by the formula (1) and/or (2):

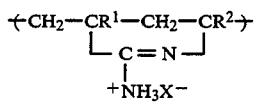  (1)

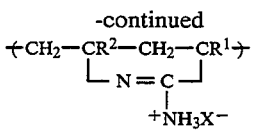  (2)

0 to 2% by mole of a repeating unit represented by the formula (3):

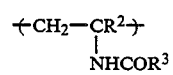  (3)

0 to 70% by mole of a repeating unit represented by the formula (4):

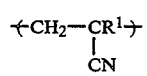  (4)

and 0 to 70% by mole of a repeating unit represented by the formula (5):

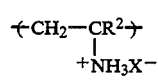  (5)

wherein R$^1$ and R$^2$ independently denote a hydrogen atom or a methyl group, R$^3$ denotes an alkyl group having 1 to 4 carbon atoms or a hydrogen atom, and X$^-$ denotes an anion; and which has a reduced viscosity of 0.1 to 10 dl/g as measured in a 1N saline solution of 0.1 g/dl at 25° C.

2. The process for making paper of claim 1, wherein the cationic polymer contains 30 to 85% by mole of the repeating unit represented by the formula (1) and/or (2).

3. The process for making paper of claim 1, wherein the cationic polymer contains 50 to 80% by mole of the repeating unit represented by the formula (1) and/or (2).

4. The process for making paper of claim 1, wherein the cationic polymer contains 5 to 60% by mole of the repeating unit represented by the formula (4) and 5 to 60% by mole of the repeating unit represented by the formula (5).

5. The process for making paper of claim 1, wherein in the cationic polymer, the total proportion of the repeating unit represented by the formula (1) and/or (2) and the repeating unit represented by the formula (5) is at least 40% by mole.

6. The process for making paper of claim 1, wherein in the cationic polymer, the total proportion of the repeating unit represented by the formula (1) and/or (2) and the repeating unit represented by the formula (5) is 60 to 90% by mole.

7. The process for making paper of claim 1, wherein in the cationic polymer, the total proportion of the repeating unit represented by the formula (1) and/or (2), the repeating unit represented by the formula (4) and the repeating unit represented by the formula (5) is at least 90% by mole.

8. The process for making paper of claim 1, wherein in the cationic polymer, the total proportion of the repeating unit represented by the formula (1) and/or (2), the repeating unit represented by the formula (4) and the repeating unit represented by the formula (5) is 97 to 100% by mole.

9. The process for making paper of claim 1, wherein in the cationic polymer, the ratio of the repeating unit represented by the formula (1) and/or (2) to the repeating unit represented by the formula (4) is 0.5 to 10.

10. The process for making paper of claim 1, wherein in the cationic polymer, the ratio of the repeating unit represented by the formula (1) and/or (2) to the repeating unit represented by the formula (4) is 2 to 5.

11. The process for making paper of claim 1, wherein in the cat ionic polymer, the ratio of the repeating unit represented by the formula (1 ) and/or (2 ) to the repeating unit represented by the formula (5) is 0.5 to 10.

12. The process for making paper of claim 1, wherein in the cationic polymer, the ratio of the repeating unit represented by the formula (1) and/or (2) to the repeating unit represented by the formula (5) is 2 to 5.

13. The process for making paper of claim 1, wherein the cationic polymer further contains 0 to 2% by mole of a repeating unit represented by the formula (6):

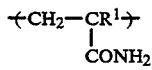
(6)

0 to 2% by mole of a repeating unit represented by the formula (7):

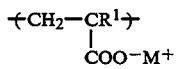
(7)

and 0 to 2% by mole of a repeating unit represented by the formula (8) and/or (9):

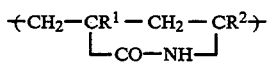
(8)

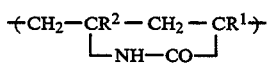
(9)

wherein $R^1$ and $R^2$ independently denote a hydrogen atom or a methyl group, and $M^+$ denotes a cation.

14. The process for making paper of claim 1, wherein the cationic polymer contains 0 to 1% by mole of the repeating unit represented by the formula (3).

15. The process for making paper of claim 1, wherein $R^3$ in the formula (3) denotes a hydrogen atom.

16. The process for making paper of claim 1, wherein 0.001 to 5.0% by weight, based on dry pulp in the slurry, of the cationic polymer is added to the pulp slurry.

17. The process for making paper of claim 1, wherein the cationic polymer is used as an additive for improving the freeness.

18. The process for making paper of claim 17, wherein 0.005 to 0.5% by weight, based on dry pulp in the slurry, of the cationic polymer is added to the pulp slurry.

19. The process for making paper of claim 17, wherein the cationic polymer has a reduced viscosity of 2 to 10 dl/g as measured in a 1N saline solution of 0.1 g/dl at 25° C.

20. The process for making paper of claim 1, wherein the cationic polymer is used as an additive for improving the filler retention.

21. The process for making paper of claim 20, wherein 0.005 to 0.5% by weight, based on dry pulp in the slurry, of the cationic polymer is added to the pulp slurry.

22. The process for making paper of claim 20, wherein the cationic polymer has a reduced viscosity of 2 to 10 dl/g as measured in a 1N saline solution of 0.1 g/dl at 25° C.

23. The process for making paper of claim 1, wherein the cationic polymer is used as an additive for improving the paper strength.

24. The process for making paper of claim 23, wherein 0.05 to 2.0% by weight, based on dry pulp in the slurry, of the cationic polymer is added to the pulp slurry.

25. The process for making paper of claim 23, wherein the cationic polymer has a reduced viscosity of 0.5 to 4 dl/g as measured in a 1N saline solution of 0.1 g/dl at 25° C.

26. A process for making paper, comprising adding to a pulp slurry, a cationic polymer which contains 50 to 90% by mole of a repeating unit represented by the formula (1) and/or (2):

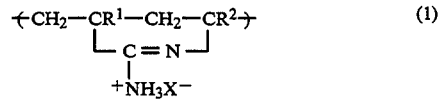
(1)

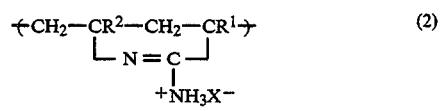
(2)

wherein $R^1$ and $R^2$ independently denote a hydrogen atom or a methyl group, and $X^-$ denotes an anion; and which has a reduced viscosity of 0.1 to 10 dl/g as measured in a 1N saline solution of 0.1 g/dl at 25° C.

27. The process for making paper of claim 26, wherein the cationic polymer further contains 2 to 20% by mole of a repeating unit represented by the formula (3):

(3)

0 to 48% by mole of a repeating unit represented by the formula (4):

(4)

and 0 to 48% by mole of a repeating unit represented by the formula (5):

(5)

wherein $R^1$ and $R^2$ independently denote a hydrogen atom or a methyl group, $R^3$ denotes an alkyl group having 1 to 4 carbon atoms or a hydrogen atom, and $X^-$ denotes an anion.

28. The process for making paper of claim 27, wherein in the cationic polymer, the total proportion of the repeating unit represented by the formula (1) and/or (2), the repeating unit represented by the formulae (4), and the repeating unit represented by the formula (5) is 97 to 100% by mole.

29. The process for making paper of claim 27, wherein the cationic polymer contains 1 to 1% by mole of the repeating unit represented by the formula (3).

30. The process for making paper of claim 27, wherein $R^3$ in the formula (3) denotes a hydrogen atom.

31. The process for making paper of claim 26, wherein 0.001 to 5.0% by weight, based on dry pulp in the slurry, of the cationic polymer is added to the pulp slurry.

32. The process for making paper of claim 26, wherein the cationic polymer is used as an additive for improving the freeness.

33. The process for making paper of claim 32, wherein 0.005 to 0.5% by weight, based on dry pulp in the slurry, of the cationic polymer is added to the pulp slurry.

34. The process for making paper of claim 32, wherein the cationic polymer has a reduced viscosity of 2 to 10 dl/g as measured in a 1N saline solution of 0.1 g/dl at 25° C.

35. The process for making paper of claim 26, wherein the cationic polymer is used as an additive for improving the filler retention.

36. The process for making paper of claim 35, wherein 0.005 to 0.5% by weight, based on dry pulp in the slurry, of the cationic polymer is added to the pulp slurry.

37. The process for making paper of claim 35, wherein the cationic polymer has a reduced viscosity of 2 to 10 dl/g as measured in a 1N saline solution of 0.1 g/dl at 25° C.

38. The process for making paper of claim 26, wherein the cationic polymer is used as an additive for improving the paper strength.

39. The process for making paper of claim 38, wherein 0.05 to 2.0% by weight, based on dry pulp in the slurry, of the cationic polymer is added to the pulp slurry.

40. The process for making paper of claim 38, wherein the cationic polymer has a reduced viscosity of 0.5 to 4 dl/g as measured in a 1N saline solution of 0.1 g/dl at 25° C.

41. A process for making paper, comprising applying, to raw paper, a cationic polymer which contains 20 to 90% by mole of a repeating unit represented by the formula (1) and/or (2):

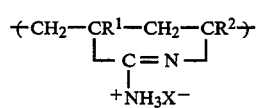 (1)

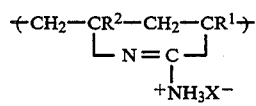 (2)

0 to 2% by mole of a repeating unit represented by the formula (3):

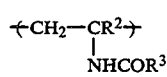 (3)

0 to 70% by mole of a repeating unit represented by the formula (4):

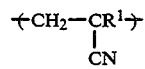 (4)

and 0 to 70% by mole of a repeating unit represented by the formula (5):

 (5)

wherein $R^1$ and $R^2$ independently denote a hydrogen atom or a methyl group, $R^3$ denotes an alkyl group having 1 to 4 carbon atoms or a hydrogen atom, and $X^-$ denotes an anion; and which has a reduced viscosity of 0.1 to 10 dl/g as measured in a 1N saline solution of 0.1 g/dl at 25° C.

42. A process for making paper, comprising applying, to raw paper, a cationic polymer which contains 50 to 90% by mole of a repeating unit represented by the formula (1) and/or (2):

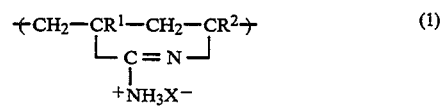 (1)

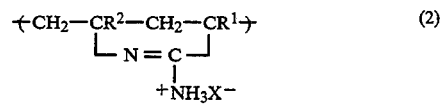 (2)

wherein $R^1$ and $R^2$ independently denote a hydrogen atom or a methyl group, and $X^-$ denotes an anion; and which has a reduced viscosity of 0.1 to 10 dl/g as measured in a 1N saline solution of 0.1 g/dl at 25° C.

43. The process for making paper of claim 42, wherein the cationic polymer further contains 2 to 20% by mole of a repeating unit represented by the formula (3):

 (3)

0 to 48% by mole of a repeating unit represented by the formula (4):

 (4)

and 0 to 48% by mole of a repeating unit represented by the formula (5):

 (5)

wherein $R^1$ and $R^2$ independently denote a hydrogen atom or a methyl group, $R^3$ denotes an alkyl group having 1 to 4 carbon atoms or a hydrogen atom, and $X^-$ denotes an anion.

* * * * *